(12) United States Patent
Kaczinski

(10) Patent No.: US 12,379,160 B2
(45) Date of Patent: Aug. 5, 2025

(54) ROTARY KILN AND METHOD FOR BURNING CARBONATE-CONTAINING MATERIAL, IN PARTICULAR LIMESTONE OR DOLOMITE

(71) Applicant: S.A. Lhoist Recherche et Développement, Ottignies-Louvain-la-Neuve (BE)

(72) Inventor: Carsten Kaczinski, Dortmund (DE)

(73) Assignee: S.A. Lhoist Recherche et Développement, Ottignies-Louvain-la-Neuve (BE)

( * ) Notice: Subject to any disclaimer, the term of this patent is extended or adjusted under 35 U.S.C. 154(b) by 0 days.

(21) Appl. No.: 18/280,424

(22) PCT Filed: Mar. 7, 2022

(86) PCT No.: PCT/EP2022/055694
§ 371 (c)(1),
(2) Date: Sep. 5, 2023

(87) PCT Pub. No.: WO2022/184935
PCT Pub. Date: Sep. 9, 2022

(65) Prior Publication Data
US 2024/0068747 A1  Feb. 29, 2024

(30) Foreign Application Priority Data

Mar. 5, 2021  (EP) .................................... 21161138

(51) Int. Cl.
*F27B 7/16* (2006.01)

(52) U.S. Cl.
CPC ........ *F27B 7/162* (2013.01); *F27B 2007/165* (2013.01)

(58) Field of Classification Search
USPC .................................................. 432/103, 118
See application file for complete search history.

(56) References Cited

U.S. PATENT DOCUMENTS 1,544,504 A * 6/1925 Tomlinson .............. F27B 7/162
432/118
2,506,739 A   5/1950 Raypholtz
(Continued)

FOREIGN PATENT DOCUMENTS

CN   209027271 U * 6/2019
DE      400236 C    8/1924
(Continued)

*Primary Examiner* — Ko-Wei Lin
(74) *Attorney, Agent, or Firm* — The Webb Law Firm

(57) ABSTRACT

The present invention relates to a rotary kiln for burning carbonate-containing material, in particular limestone or dolomite, including a rotary tube having an inlet end for feeding in the material to be burned and an outlet end for discharging the burned material; and a calciner unit which is arranged in the region of the outlet end, the rotary tube having an inlet zone at its inlet end and having an outlet zone at its outlet end, with a preheating zone and a burning zone being arranged between the inlet zone and the outlet zone in the transport direction of the material. The rotary kiln is characterized according to the invention in that a plurality of projections are arranged in the preheating zone of the rotary tube, the projections being arranged in groups one behind the other and substantially in parallel with the longitudinal axis of the rotary tube, with projections of adjacent groups of projections that are adjacent in the circumferential direction of the rotary tube being offset relative to one another in the longitudinal direction of the rotary tube such that spiral transport paths for the material to be burned are formed in the preheating zone. The present invention further relates to a method for burning carbonate-containing material, in particular limestone or dolomite.

20 Claims, 10 Drawing Sheets

(56) References Cited

U.S. PATENT DOCUMENTS

| | | | |
|---|---|---|---|
| 2,939,693 A | 6/1960 | Old et al. | |
| 3,124,338 A | 3/1964 | Harris | |
| 3,758,089 A * | 9/1973 | Kocks | C22B 1/14 |
| | | | 266/144 |
| 4,038,021 A | 7/1977 | Benson | |
| 4,136,965 A | 1/1979 | Sunnergren et al. | |
| 4,307,520 A | 12/1981 | Lutz | |
| 4,338,732 A * | 7/1982 | Coxhill | E01C 19/1036 |
| | | | 432/118 |
| 4,459,921 A | 7/1984 | Unger | |
| 4,475,886 A | 10/1984 | Tyler | |
| 4,813,784 A | 3/1989 | Musil | |
| 5,083,382 A | 1/1992 | Brashears | |
| 5,203,693 A | 4/1993 | Swanson | |
| 5,302,118 A | 4/1994 | Renegar et al. | |
| 5,380,082 A | 1/1995 | Milstead | |
| 5,380,084 A * | 1/1995 | Milstead | B01F 27/112 |
| | | | 432/118 |
| 5,463,819 A | 11/1995 | Komori | |
| 5,480,226 A | 1/1996 | Milstead | |
| 5,515,620 A | 5/1996 | Butler | |
| 5,623,883 A | 4/1997 | Davidson et al. | |
| 5,873,714 A | 2/1999 | Mosci | |
| 5,975,752 A | 11/1999 | Doerksen | |
| 6,164,809 A | 12/2000 | Hawkins | |
| 6,183,244 B1 | 2/2001 | Doumet | |
| 7,204,636 B2 | 4/2007 | Didion | |
| 7,452,203 B2 | 11/2008 | Laux et al. | |
| 7,811,083 B2 | 10/2010 | Bohringer et al. | |
| 8,172,448 B1 | 5/2012 | Hudman et al. | |
| 9,080,813 B1 | 7/2015 | Deckebach | |
| 2003/0165788 A1 | 9/2003 | McCarty | |
| 2004/0118006 A1 * | 6/2004 | Jerzembski | F27B 7/34 |
| | | | 34/201 |
| 2007/0144112 A1 * | 6/2007 | Fumalle | E02D 29/14 |
| | | | 52/784.11 |
| 2016/0084574 A1 | 3/2016 | Giebelhausen et al. | |
| 2020/0049407 A1 * | 2/2020 | Son | F27B 7/16 |

FOREIGN PATENT DOCUMENTS

| | | | | |
|---|---|---|---|---|
| DE | 423492 C | 1/1926 | | |
| DE | 7029355 U | 8/1972 | | |
| DE | 2325781 A1 | 11/1974 | | |
| EP | 0004756 A2 | 10/1979 | | |
| EP | 3444549 A1 * | 2/2019 | | F26B 11/0409 |
| FR | 443783 A | 10/1912 | | |
| JP | 2008122043 A | 5/2008 | | |

* cited by examiner

ROTARY KILN AND METHOD FOR BURNING CARBONATE-CONTAINING MATERIAL, IN PARTICULAR LIMESTONE OR DOLOMITE

CROSS-REFERENCE TO RELATED APPLICATIONS

This application is the United States national phase of International Application No. PCT/EP2022/055694 filed Mar. 7, 2022, and claims priority to European Patent Application No. 21161138.9 filed Mar. 5, 2021, the disclosures of which are hereby incorporated by reference in their entireties.

BACKGROUND OF THE INVENTION

Field of the Invention

The invention relates to a rotary kiln for burning carbonate-containing material, in particular limestone or dolomite, comprising a rotary tube having an inlet end for feeding in the material to be burned and an outlet end for discharging the burned material, and a calciner unit which is arranged in the region of the outlet end, the rotary tube having an inlet zone at its inlet end and having an outlet zone at its outlet end, with a preheating zone and a burning zone being arranged between the inlet zone and the outlet zone in the transport direction of the material. Furthermore, the present invention relates to a method for burning carbonate-containing material, in particular limestone and dolomite, in such a rotary kiln.

Description of Related Art

Rotary kilns for burning carbonate-containing material have been known from the prior art for decades and have proven to be an efficient and reliable type of furnace for continuously calcining various types of materials. The published prior art can be found, for example, in EP 0 004 756 A2 or U.S. Pat. No. 5,873,714.

A central component of a rotary kiln is a long cylindrical rotary tube (often 100 m or longer), which is typically inclined at about 2 to 7% with respect to the horizontal. The rotary tube rotates slowly at 0.5 to 1.5 rpm around its axis, and the material to be burned which is introduced into the rotary tube at its inlet end by means of a screw conveyor or the like slowly moves through the rotary tube due to gravity in the direction of a flame generated by a burner arranged in the region of the kiln outlet. In this process, the material to be burned moves from the inlet zone, which is only a few meters long, into the preheating zone (sometimes also referred to as the transition zone), where temperatures of approx. 1100-1200° C. are already present, and from there into an extended burning zone with maximum temperatures of 1500-1600° C. Accordingly, the actual calcination of the material to be burned takes place here to a very large extent. The burning zone is in turn followed by the outlet zone of the rotary tube, which is only a few meters long and from where the burned material usually falls through a shaft onto a cooling unit. Typically, the kiln is filled to about 8 to 20% of the kiln diameter with the material to be burned.

In terms of efficient kiln operation, high throughput rates are always aimed for, while at the same time ensuring that calcination of the material to be burned is complete and that all carbon dioxide is removed from the material. Thorough intermixing of the material to be burned is crucial for a rapid and complete calcination.

Another problem in practical operation is the formation of dust. On the one hand, this leads to material loss and, on the other, to a release of dust into the environment, which is disadvantageous for ecological reasons and, depending on the concentration, can also pose a health hazard.

SUMMARY OF THE INVENTION

It is therefore an object of the present invention to provide a rotary kiln for burning carbonate-containing material, in particular limestone or dolomite, of the type mentioned at the outset, which ensures a high material throughput and at the same time as complete a calcination as possible of the material to be burned. Furthermore, a significant reduction in dust formation is desired during kiln operation.

According to a first aspect of the present invention, the aforementioned problem is solved with a rotary tube as described herein in that a plurality of projections are arranged in the preheating zone of the rotary tube, the projections being arranged in groups one behind the other and substantially in parallel with the longitudinal axis of the rotary tube, with projections of adjacent groups of projections that are adjacent in the circumferential direction of the rotary tube being offset relative to one another in the longitudinal direction of the rotary tube such that spiral transport paths for the material to be burned are formed in the preheating zone.

The rotary kiln according to the invention is characterized by reliable operation with a high, uniform material throughput. In particular, the provision of a plurality of projections—also known in technical terms as "drivers"—which, according to the invention, are arranged in groups one behind the other and substantially in parallel with the longitudinal axis of the rotary tube, results in greatly improved intermixing of the material to be burned and thus faster calcination at the same time intervals, since, as a result of the thorough mixing, not only the material lying on the surface in the material bed is exposed to high calcination temperatures.

The staggered arrangement of projections arranged adjacent to one another in the circumferential direction of the rotary tube, as provided in the invention, with the projections each belonging to adjacent groups of projections, forms spiral transport paths for the material to be burned. This enables a comparatively rapid transport of the material to be burned through the rotary tube, which, in combination with the improved intermixing of the material, leads to a higher kiln throughput overall and thus increases the efficiency of the burning process.

Due to the very high temperatures already prevailing in the preheating zone, according to a first advantageous embodiment of the invention, it is preferred that at least some of the projections, preferably all of them, each contain a refractory material. These may be various high temperature resistant materials. Concrete, in particular refractory concrete, as known from the prior art per se, proves to be particularly suitable.

In experiments by the applicant, various geometries have proven to be suitable for the projections provided according to the invention in the preheating zone. Prismatic geometries, in particular in the form of a trapezoidal prism, especially an isosceles trapezoidal prism, are preferred. Such a trapezoidal prism is preferably aligned parallel to the longitudinal extension of the rotary tube and accordingly has two leg surfaces inclined with respect to the radius of the rotary tube. These may include an angle to the trapezoidal base between 15° and 85°, preferably between 35° and 75° and particularly preferably between 60° and 70°.

With regard to the dimensioning of the projections, extensive research was carried out by the applicant. It has been found that particularly good results in terms of thorough intermixing of the material to be burned with low dust formation can be achieved if at least some of the projections have a height in the radial direction relative to the rotary tube of between 50 mm and 500 mm, preferably between 100 mm and 300 mm and particularly preferably of approx. 200 mm.

Furthermore, particularly good results in terms of thorough material intermixing and rapid transport of the material through the preheating zone of the rotary tube can be achieved by at least some projections having a length in the longitudinal direction of the rotary tube of between 50 mm and 2000 mm, especially between 100 mm and 1000 mm, preferably between 200 mm and 750 mm and particularly preferably between 350 mm and 450 mm, typically of approx. 400 mm.

Furthermore, the width of at least some projections perpendicular to the longitudinal direction of the rotary tube may be between 50 mm and 1000 mm, preferably between 100 mm and 500 mm and more preferably between 150 mm and 300 mm, typically 300 mm.

As already mentioned, for projections, in particular trapezoidal geometries have been found to be particularly advantageous. With regard to the dimensioning of the trapezoidal surface substantially perpendicular to the longitudinal axis of the kiln, it is preferred that the width of the lower trapezoidal base is between 100 mm and 400 mm, preferably between 150 mm and 300 mm, typically at approx. 300 mm, and that the width of the upper base is between 30 mm and 200 mm, preferably between 50 mm and 200 mm and particularly preferably between 70 mm and 130 mm, typically at approx. 100 mm.

According to the invention, the projections are arranged in groups one behind the other and substantially in parallel with the longitudinal axis of the rotary tube. Thereby, according to the applicant's research, it is preferred that the ratio between the length of a projection in the longitudinal direction of the rotary tube and the distance between two projections adjacent in the longitudinal direction of the rotary tube is between about 2:1 and 1:2, preferably between approx. 1.5:1 and 1:1.5, and particularly preferably is approx. 1:1. On the one hand, this ensures thorough material intermixing, and on the other hand, the distances are dimensioned in such a way that sufficiently wide spiral transport paths are created between the projections.

The projections provided in the burning zone according to the invention can be permanently connected to the inner lining of the rotary tube. However, in order to ensure a secure connection between the inner lining of the rotary tube and the projections, according to a further advantageous embodiment of the invention, it is provided that at least some of the projections are fixed to the inner side of the rotary tube shell by means of a welded metallic anchorage.

According to a further advantageous embodiment of the invention, it is provided that 3 to 9, especially 4 to 8, particularly preferably 5 to 7, and most preferably 6 groups of projections arranged one behind the other in the longitudinal direction are provided distributed across the circumference of the rotary tube.

The groups of projections provided in accordance with the invention, arranged one behind the other and substantially in parallel with the longitudinal axis of the rotary tube, may be arranged along the entire length of the preheating zone. According to a particularly advantageous embodiment of the invention, it is provided that the groups of projections extend across a fifth to a third of the overall length of the rotary tube.

According to a particularly advantageous embodiment of the invention, it may further be provided that at least one further projection, preferably a plurality of further projections, is provided in the inlet zone of the rotary tube, the at least one further projection having at least one sliding surface inclined with respect to the longitudinal axis of the rotary tube for conveying the material to be burned from the inlet zone to the preheating zone.

This takes advantage of the fact that the material to be burned comes to rest on the at least one sliding surface of the material bed due to the rotation of the at least one further projection through the material bed and, as a result of the particular inclination of the sliding surface, slides rapidly towards the preheating zone due to gravity. It is understood that the direction of rotation of the rotary tube and the orientation of the sliding surface in the circumferential direction of the rotary tube must be adapted to one another accordingly. At the same time, this also considerably reduces dust formation, since grinding of the material to be burned against the wear rings of the kiln inlet seal as a result of a rearward movement of the material in the inlet zone is effectively prevented.

Different angles of inclination can be provided on the sliding surface of the at least one further projection. According to an advantageous embodiment of the invention, the sliding surface of the at least one further projection has an inclination to the longitudinal axis of the rotary tube of from 15° to 70°, in particular from 35° to 55°. Particularly good results were achieved at an angle of inclination between 40° and 50°, especially approx. 45°.

Due to the high temperatures already prevailing in the inlet zone of the rotary tube, it is preferred that the at least one further projection contains a refractory material. These can be various high-temperature resistant materials, as are known from the prior art per se. Concrete, in particular refractory concrete, as known from the prior art, proves to be particularly suitable.

For the at least one further projection, various geometries have proven suitable in experiments conducted by the applicant. Prismatic geometries are preferred, in particular in the form of a straight prism with a triangular base, especially in the form of a right triangle, in which the at least one sliding surface is formed by the hypotenuse of the right triangle.

For particularly good efficiency in conveying the material to be burned from the inlet zone in the direction of the preheating zone, the height of the at least one projection, i.e. its extension in the radial direction with respect to the cylindrical rotary tube, is important. According to an advantageous embodiment of the invention, the at least one further projection has a height extending in the radial direction of the rotary tube of from 100 mm to 500 mm, preferably from 160 mm to 300 mm, and particularly preferably from 180 mm to 250 mm, typically approx. 200 mm. This ensures that a sufficient amount of material rests on the at least one sliding surface of the at least one further projection and subsequently slides in the direction of the preheating zone due to the inclination of the sliding surface. It may further be provided that the at least one further projection has a length extending substantially in parallel with the longitudinal axis of the rotary tube of 100 mm to 2000 mm, preferably 300 mm to 500 mm, and most preferably 350 mm to 450 mm, typically approx. 400 mm.

The at least one further projection may be permanently connected to the inner lining of the rotary tube. However, in order to ensure a secure connection between the inner lining of the rotary tube and the at least one further projection, according to a further advantageous embodiment of the invention it is provided that the at least one further projection is fixed to the inner side of the rotary tube shell by means of a metallic anchorage, in particular a welded metallic anchorage.

According to a particularly advantageous embodiment of the invention, it is provided that a plurality of further projections is provided in the inlet zone of the rotary tube, the further projections being arranged in a row as a group in such that the respective sliding surfaces of the further projections form a common sliding surface for the material to be burned. This results in a particularly effective conveyance of the material to be burned from the inlet zone of the rotary tube to its preheating zone. In this case, the individual further projections can be lined up end to end, i.e., substantially without gaps. It is also possible to line them up with a gap in between, for example to allow for thermal expansion, but the gap width must be dimensioned such that the function of a common sliding surface is maintained.

Because a common sliding surface is provided by a plurality of further projections arranged in a row as a group, on the one hand a particularly long sliding surface can be provided which extends practically along the entire extent of the inlet zone. At the same time, in the event of damage to, for example, an individual further projection from the group of further projections arranged in a row, these can be specifically replaced without having to dismantle the entire structure.

The group of further projections arranged in a row can comprise a varying number of further projections. In particular, the common sliding surface for the material to be burned can be formed by 3 to 9 further projections, in particular by 5 to 7 further projections and very particularly preferably by 6 further projections.

It is particularly preferred in terms of the simplest possible construction of the rotary kiln according to the invention that the plurality of further projections are formed substantially identically to one another, such that a common sliding surface is formed with a substantially constant slope or sliding angle with respect to the longitudinal axis of the rotary tube.

A further improvement in the conveyance of the material to be burned through the inlet zone of the rotary tube is achieved by arranging, across the circumference of the rotary tube, 2 to 8, in particular 4 to 6 and very particularly preferably 6 further projections or groups of further projections arranged in a row.

According to a further particularly advantageous embodiment of the invention, it may be provided that the rotary tube has at least one additional projection, preferably a group of additional projections, in the region of the outlet zone, in order to prevent the formation of clusters in the burned material. This results in particularly uniform cooling of the entire burned material in the region of the outlet end, which effectively improves kiln performance and the quality of the burned material, and also protects downstream plant components, such as grate coolers, from overheating. This in turn leads to an extended service life of the entire kiln.

Preferably, a plurality of additional projections is provided in the region of the outlet zone, the additional projections being arranged as groups in the circumferential direction of the rotary tube. In this case, the additional projections arranged in groups around the circumference are preferably offset from one another in the longitudinal direction of the rotary tube in order to maximize the material intermixing and thus the uniformity of the cooling effect. Here, plurality of groups of additional projections—for example, three—is in turn preferably provided in the longitudinal direction of the rotary tube.

The additional projections can have different geometries. Particularly preferred is the geometry of a truncated pyramid with the base of an isosceles acute triangle with, for stability reasons, preferably a truncated apex, the truncated acute angle leading in the direction of rotation of the rotary tube and thus plowing, as it were, through the burned material. In order to ensure sufficient heat resistance, it can be provided that the additional projections contain concrete, in particular refractory concrete known from the prior art. Preferably, the additional projections have a height of between 100 mm and 300 mm, preferably of approx. 200 mm, and a length in the circumferential direction of the rotary tube (height of the isosceles triangular base surface of the truncated pyramid) of between 300 mm and 500 mm, preferably of approx. 400 mm. The width of the side of the triangle opposite the acute angle of the isosceles triangular base surface is between 50 mm and 150 mm, preferably approx. 300 mm.

According to a further aspect of the present invention, the object mentioned at the outset is achieved with a method for burning carbonate-containing material, in particular limestone or dolomite, which comprises the following steps:
  introducing the carbonate-containing material into the rotary tube of a rotary kiln according to any one of claims 1 to 14,
  burning the carbonate-containing material, the carbonate-containing material moving through the rotary tube from the inlet zone through the preheating zone and the burning zone to the outlet zone, the rotary tube rotating in a direction of rotation,
  conveying the carbonate-containing material through the preheating zone, the groups of projections which are arranged one behind the other and substantially in parallel with the longitudinal axis of the rotary tube being arranged offset in relation to one another in the longitudinal direction of the rotary tube, and the rotational speed and inclination of the rotary tube being adjusted such that the material is conveyed through the preheating zone on spiral transport paths.

The advantages mentioned above apply accordingly to the method. In particular, an efficient burning process is proposed, which is characterized by a high material throughput through the rotary kiln, a uniformly high product quality for the burned material as a result of complete calcination, and by being easy to carry out. Specifically, in the preheating zone, the groups of projections achieve thorough intermixing of the material to be burned with minimal dust formation.

BRIEF DESCRIPTION OF THE DRAWINGS

The invention is explained in more detail below in reference to a drawing depicting an exemplary embodiment. Shown are.

DESCRIPTION OF THE INVENTION

Figure 1:
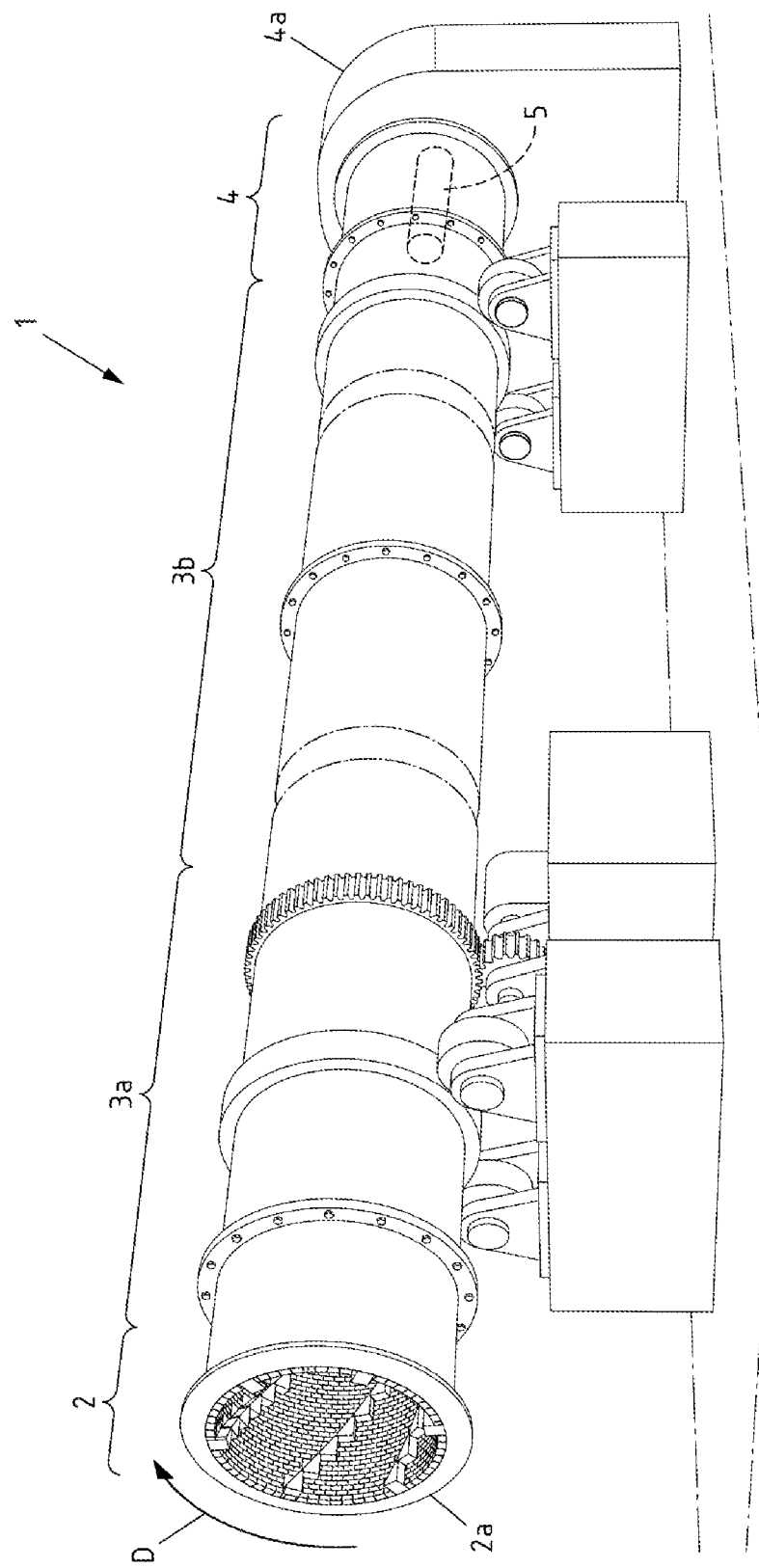
FIG. 1 the rotary tube of a rotary kiln in a perspective view.

In FIG. 1, the rotary tube 1 of a rotary kiln is shown with conventional mounting and drive components, which will not be discussed in more detail below. The rotary tube 1 comprises an inlet end 2a—shown here on the front—and a rear outlet end 4a. Along the longitudinal extension of the rotary tube 1, the rotary tube 1 comprises, with respect to the material feed, burning and material discharge process, an inlet zone 2, a preheating zone 3a (also called "transition zone"), a burning zone 3b and an outlet zone 4 (see also FIGS. 2 and 5). Arranged in the region of the outlet end 4a is a calciner lance 5, by means of which a flame projecting into the rotary tube 1 is generated during operation of the rotary kiln. If, for example, the rotary tube 1 has a total length of approx. 90 m, the length of the inlet zone 2 is typically approx. 2 m, that of the preheating zone 3a approx. 32 m, the length of the burning zone 3b approx. 53 m, and that of the outlet zone 4 approx. 3 m. The highest temperatures generated by the calciner flame during operation of the rotary kiln are achieved in the burning zone 3b and amount to approx. 1500-1600° C., so that the very predominant part of the calcination reaction takes place in this zone.

Figure 2:
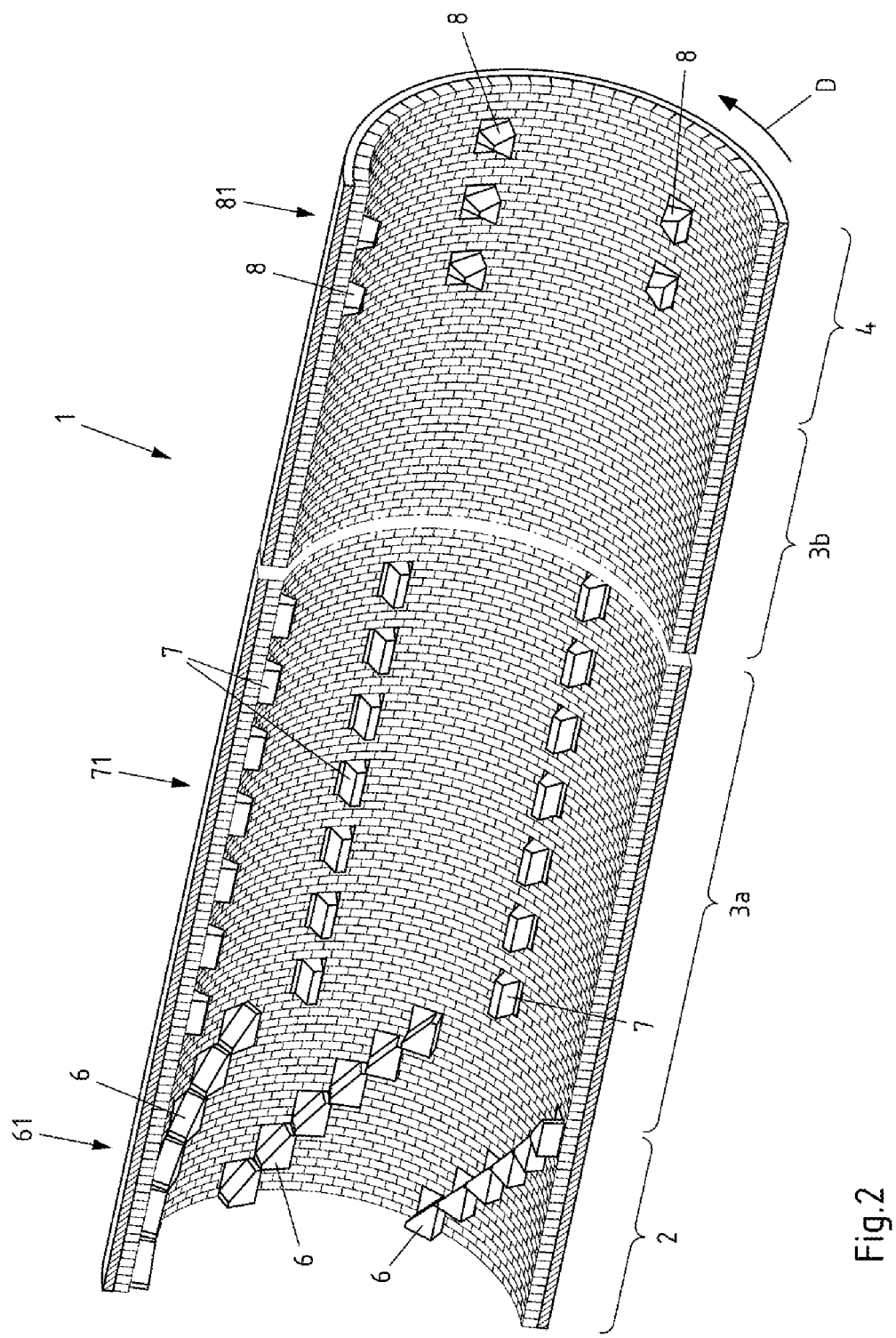
FIG. 2 the rotary tube of FIG. 1 in truncated perspective longitudinal sectional view, FIG. 3 an enlarged section of the preheating zone of the rotary tube of FIG. 1 in a perspective longitudinal sectional view, FIG. 4 a projection of the preheating zone of the rotary tube of FIG. 1 in a perspective view, FIG. 5 the two-dimensional truncated representation of the "unwound" inner kiln wall of the rotary tube of FIG. 2 in a highly schematic form, FIG. 6 a sectional enlargement of the rotary tube of FIG. 1 with partially cut out kiln wall in a perspective view, FIG. 7 an enlarged section of the inlet zone of the rotary tube of FIG. 1 in a perspective longitudinal sectional view, FIG. 8 a further projection in the inlet zone of the rotary tube of FIG. 1 in a perspective view, FIG. 9 an enlarged section of the outlet zone of the rotary tube of FIG. 1 in a perspective longitudinal sectional view, and FIG. 10 an additional projection in the outlet zone of the rotary tube of FIG. 1 in a perspective view.
Figure 5:
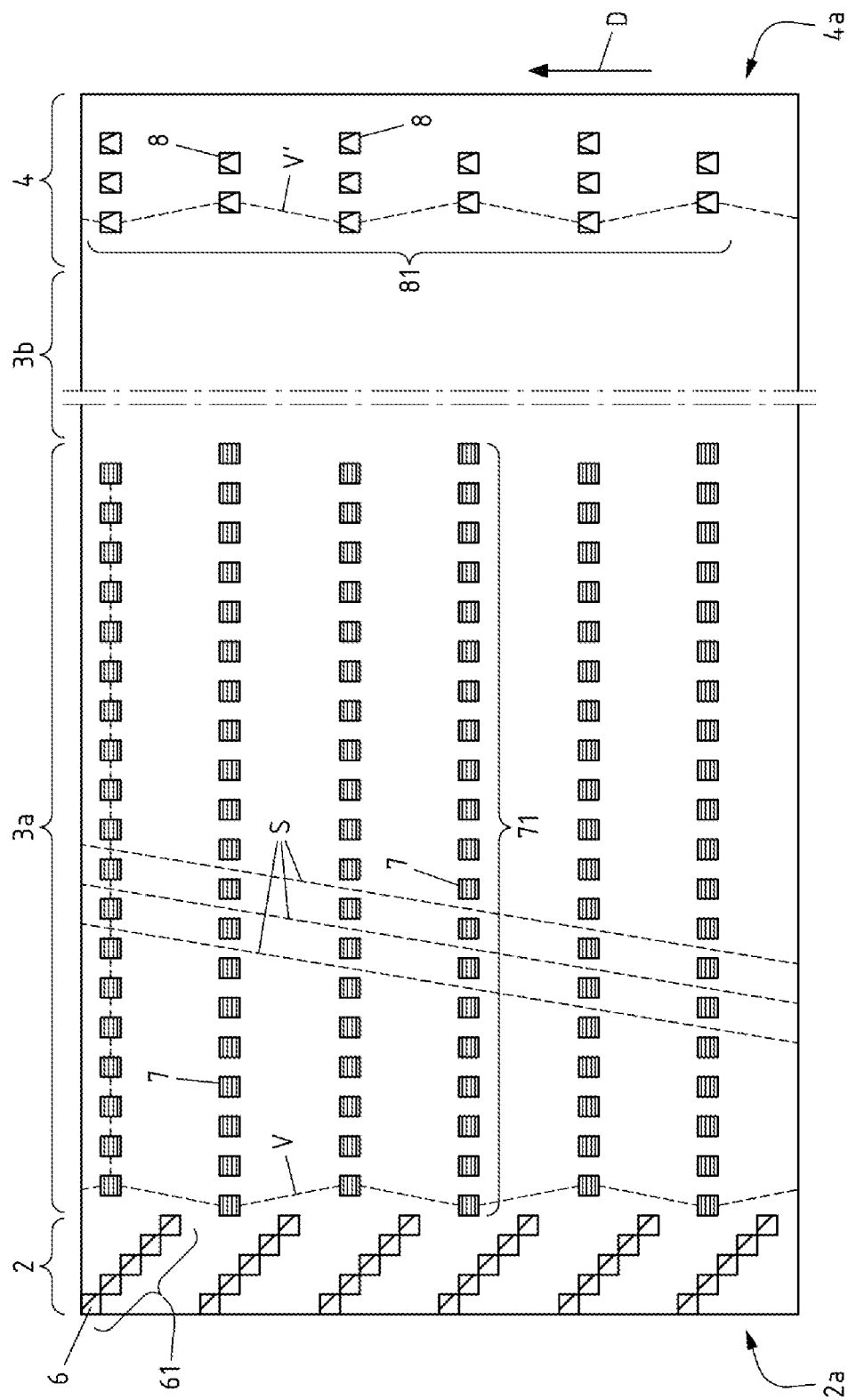
Figure 6:
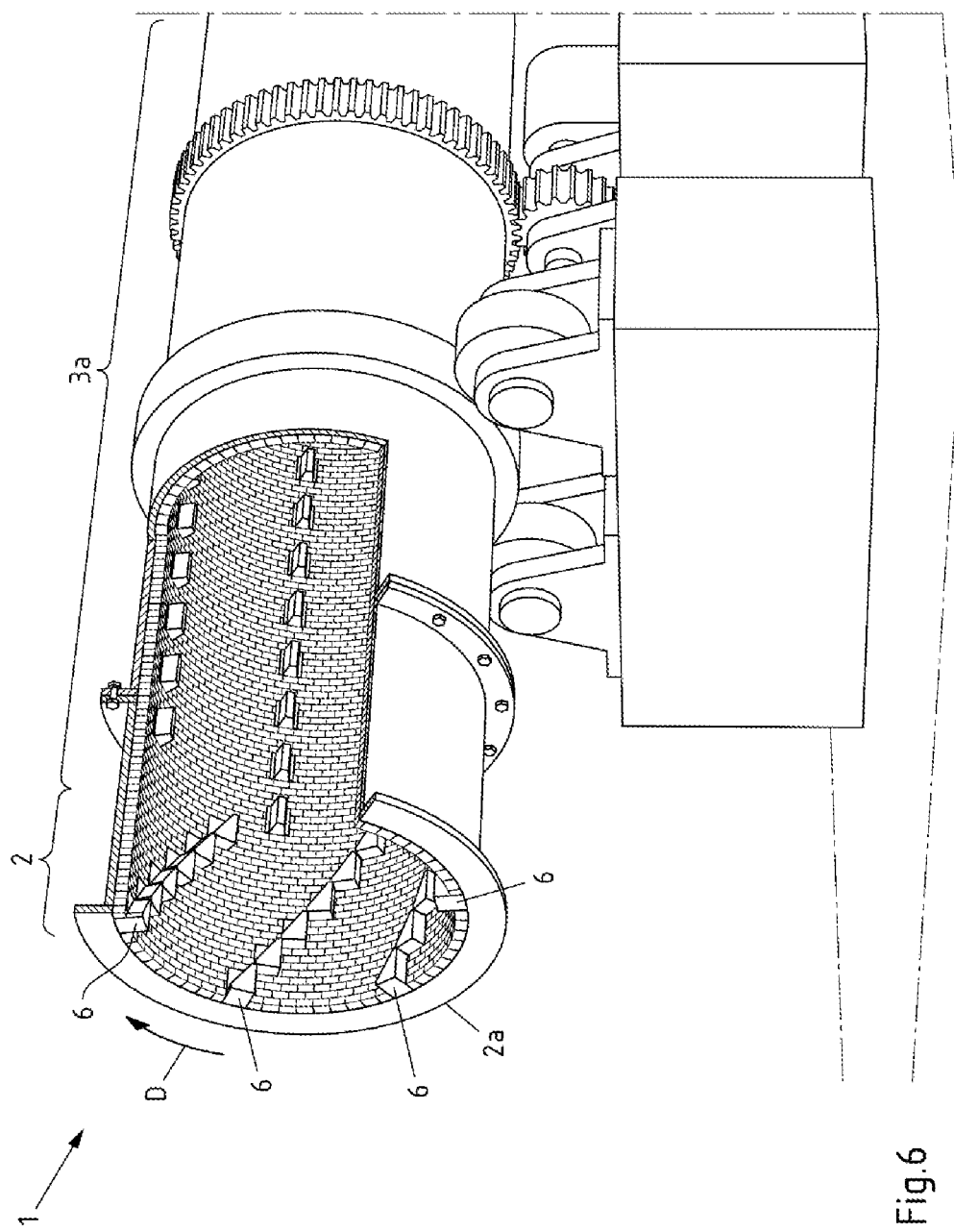
Figure 7:
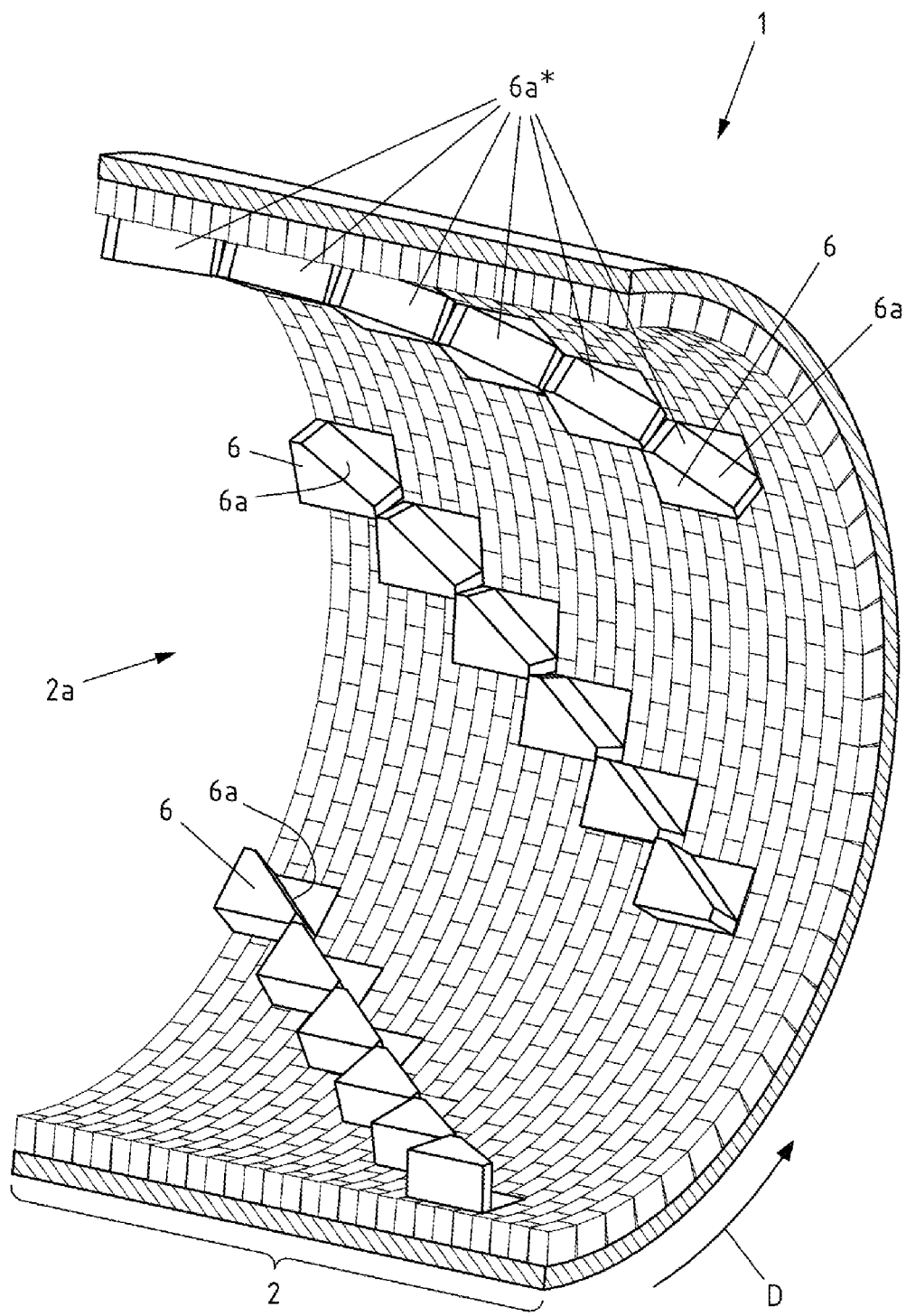

As shown in the perspective longitudinal sectional view of the rotary tube 1 of FIG. 2, the rotary tube 1 comprises a plurality of projections 7 (also called "drivers") in the preheating zone 3a. As can be seen, these are arranged one behind the other as groups 71 in parallel with the longitudinal axis of the rotary tube 1. A total of six groups 71 of projections 7 are provided distributed across the inner circumference of the rotary tube 1, as can be seen in particular from the representation of the "unwound" inner kiln wall of FIG. 5. The projections 7 are arranged in such a way that projections 7 of adjacent groups 71 of projections 7 arranged adjacent to one another in the circumferential direction of the rotary tube 1 are offset from one another in the longitudinal direction of the rotary tube 1 (see FIG. 5). Since, as can be seen in FIGS. 2 and 5, the projections 7 arranged in groups in rows form identical rows—i.e., the length of the projections 7 and the spaces between the projections 7 is identical for each group 71—adjacent whole groups 71 are accordingly also offset from one another in the longitudinal direction of the rotary tube 1. The groups 71 of projections 7 preferably occupy one third to one fifth of the total length of the rotary tube 1.

Figure 3:
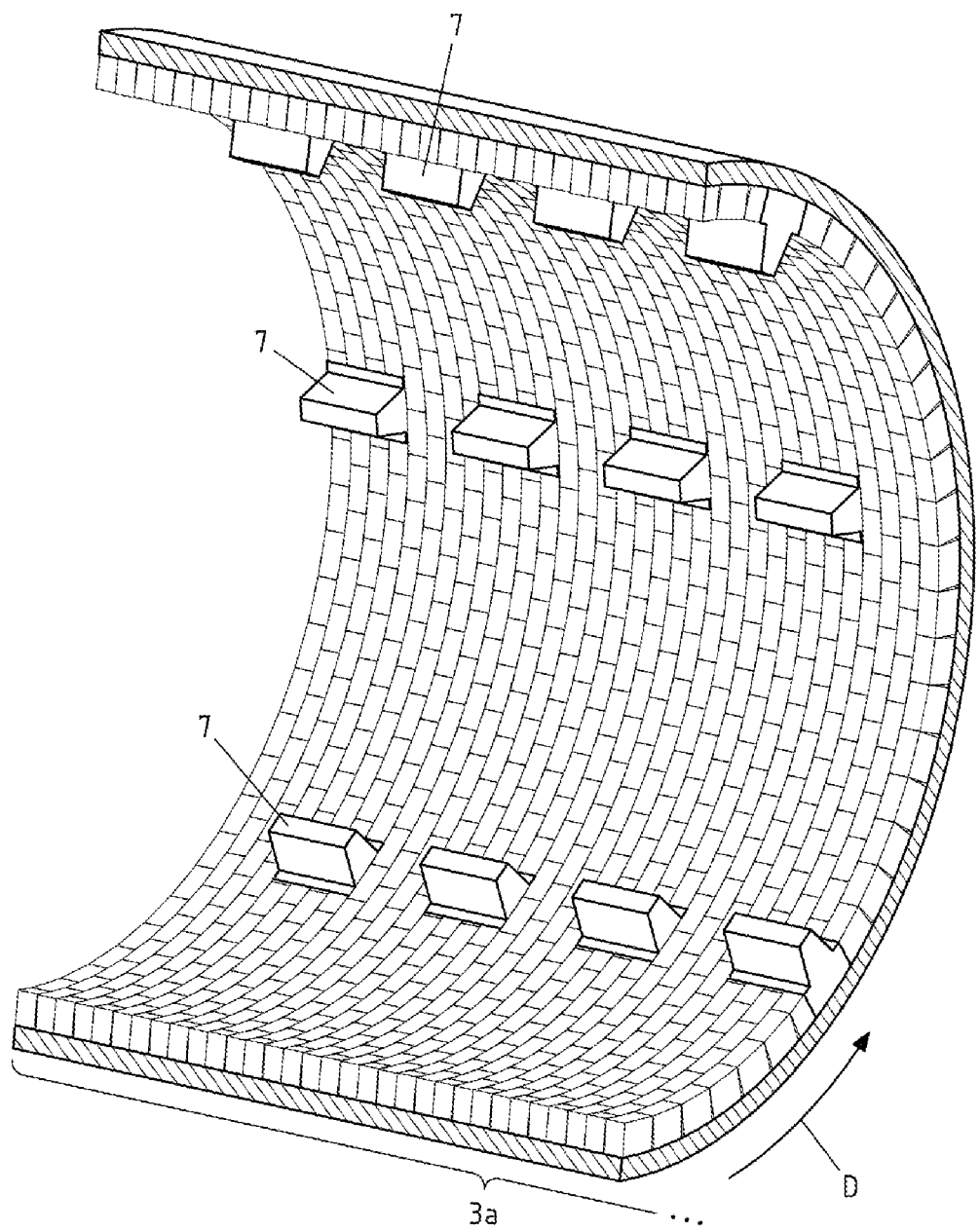

A more detailed representation of the projections 7 is shown in FIG. 3. Here and in FIG. 4 it can be seen that the projections 7 are each formed as a trapezoidal prism with a length of approx. 400 mm and a height of approx. 200 mm. Furthermore, the width of the lower trapezoidal base is approx. 300 mm, while the upper trapezoidal base has a width of approx. 100 mm. This defines inclined leg surfaces 7a along the longitudinal extension of the projections 7, in the present case at an angle of approx. 76° to the lower trapezoidal base. The trapezoidal design of the projections 7 ensures that the material intermixed by the projections 7 in the preheating zone 3a during kiln operation does not fall off the projections 7 with increased dust formation, but rather slides down along the leg surfaces 7a.

Figure 4:
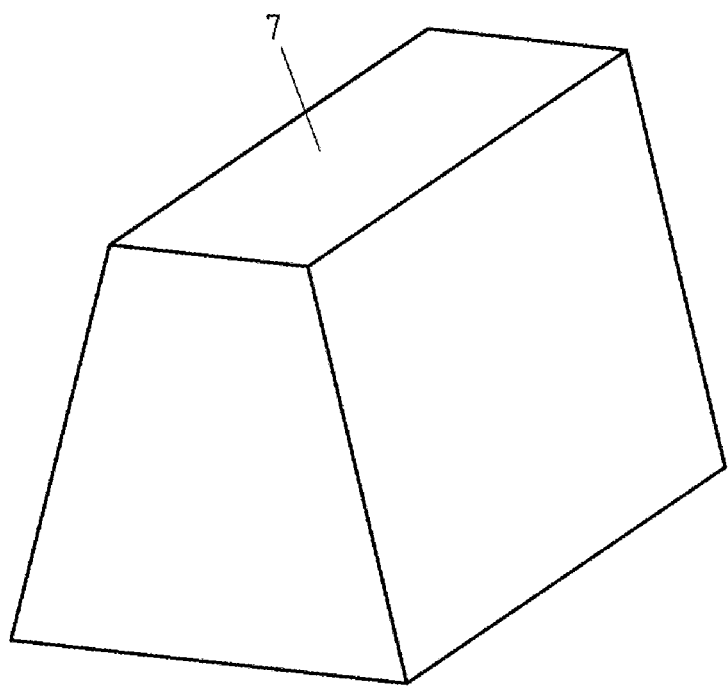

As can be seen from the kiln lining shown in FIG. 4, the length of the spaces between the projections 7 of a group 71 arranged in a row corresponds approximately to the length of the projections 7 themselves, and the projections 7 of respective adjacent groups 71 are thus offset from each other with a "gap". This forms spiral or helical transport paths through the preheating zone 3a of the rotary tube 1 (shown in FIG. 5 as oblique dashed lines S), along which the material to be burned can be transported rapidly through the preheating zone 3a.

In the longitudinal sectional view of FIG. 2, it can further be seen that a plurality of further projections 6 are arranged in the inlet zone 2 of the rotary tube 1, which projections have a specific shape and are arranged in rows as groups 61 in a stepped form, as described below. The projections 6 are also referred to in technical terms as "displacers".

Figure 8:
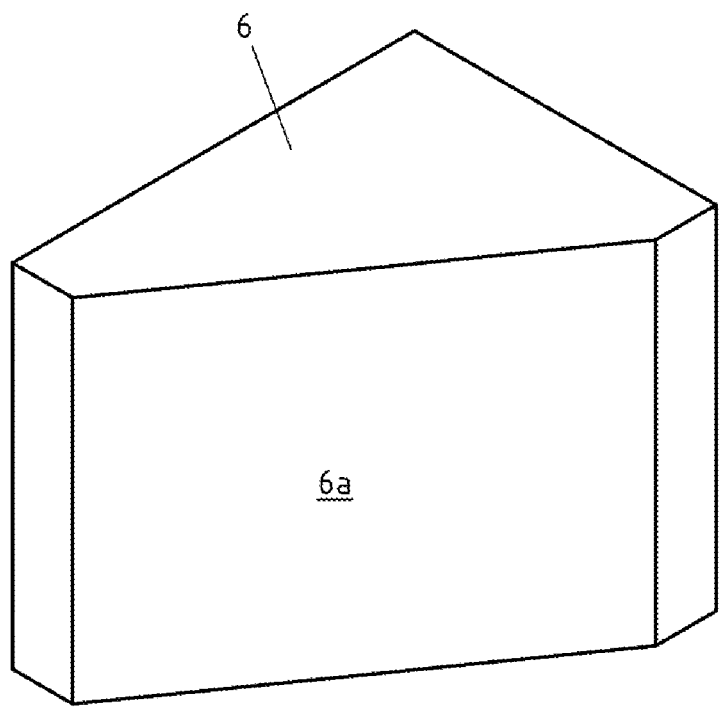

As shown in FIGS. 1, 2 and 5-8, the further projections 6, which are arranged as group 61 of, in the present case, six further projections arranged in a row, are substantially formed identical to one another and, according to FIG. 8, have substantially the shape of a straight prism with the base of a right isosceles triangle, the non-rectangular angles of the triangle being truncated. Each further projection 6 has a sliding surface 6a, which is arranged inclined to the longitudinal axis of the rotary tube 1. Preferably, an angle of inclination of approx. 45° is selected. As mentioned, the further projections 6 are arranged in rows in a stepped manner, in such a way that a common sliding surface 6a* is formed by the individual sliding surfaces 6a of the further projections 6, which in the present case is likewise inclined at an angle of approx. 45° with respect to the longitudinal axis of the rotary tube 1.

Furthermore, the sliding surfaces 6a of the further projections 6 or the common sliding surface 6a* of the projections 6 arranged in groups relative to the direction of rotation D of the rotary tube 1 are aligned in such a way that during operation of the kiln the material to be burned (not shown) comes to rest on the sliding surfaces 6a of the further projections 6, and, due to the selected inclination of the sliding surfaces 6a relative to the longitudinal axis of the rotary tube 1, slides rapidly towards the preheating zone 3 due to gravity, without any undesired rearward movement of the material to be burned in the direction of the inlet end 2a.

As shown in FIGS. 1 and 5, a plurality of groups 61 of further projections 6 arranged in a row in a stepped form are provided across the circumference distributed on the inner wall of the rotary tube 1. In the present case, a number of six groups 61 is selected.

Figure 9:
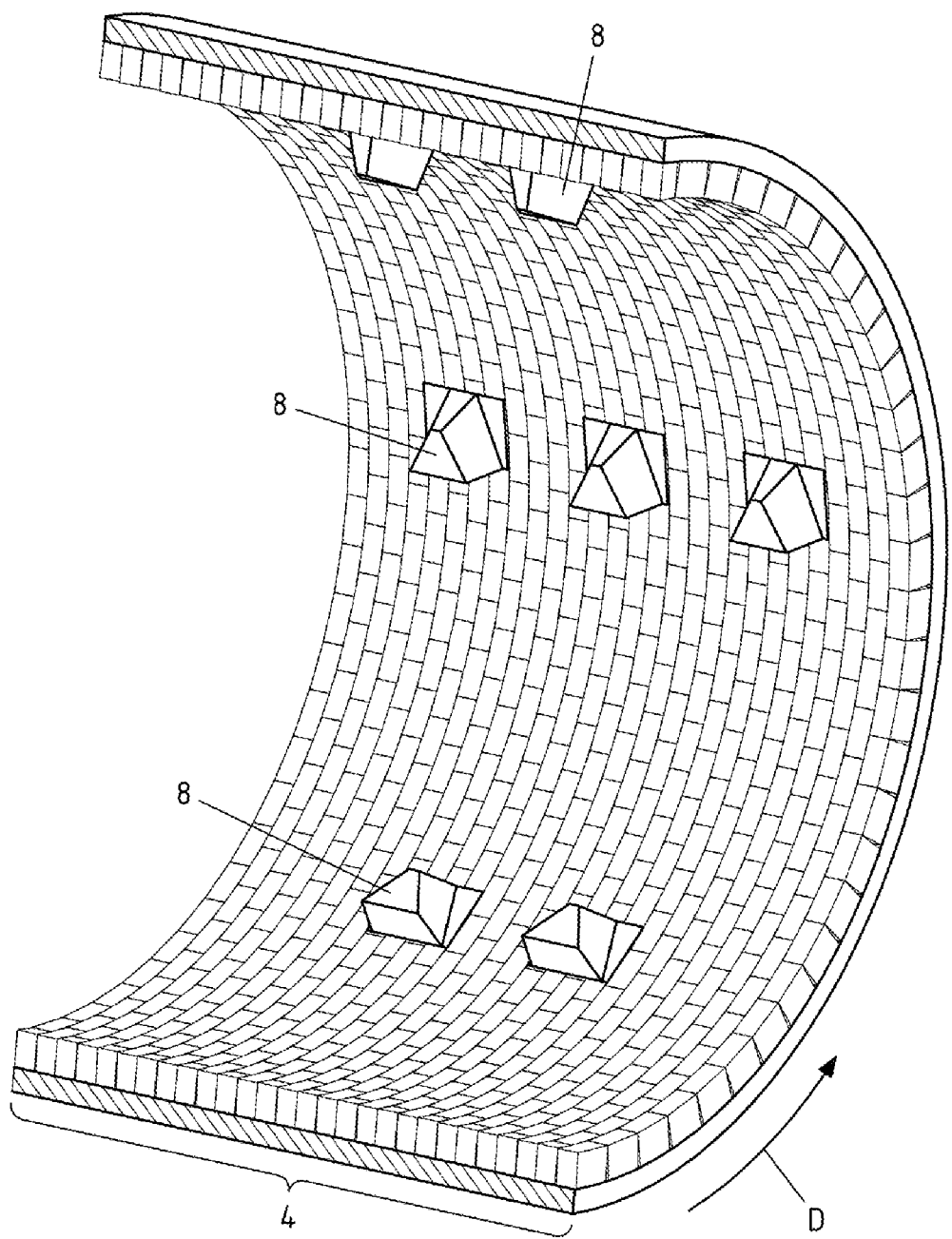
Figure 10:
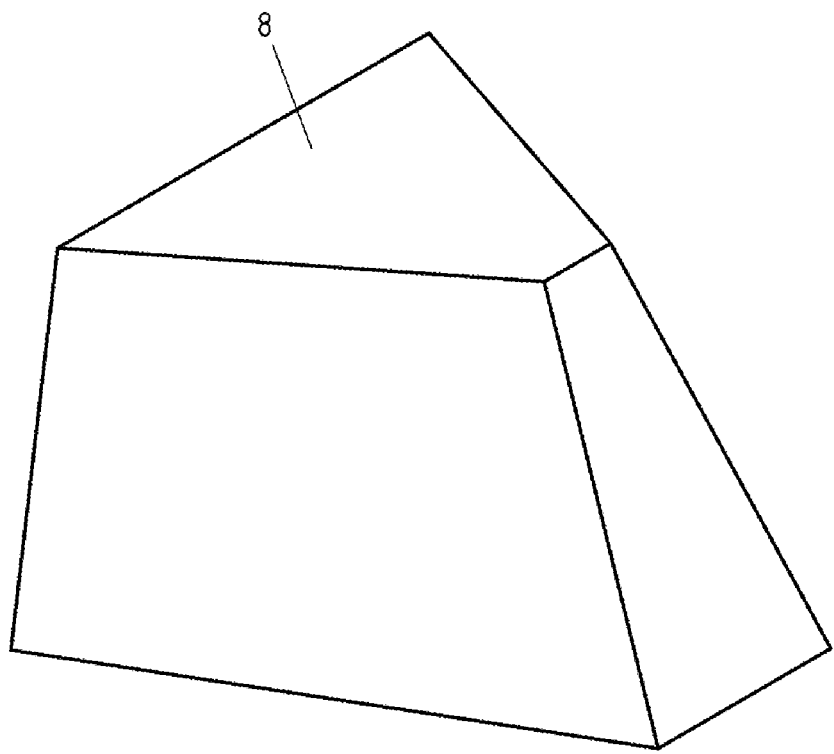

Furthermore, it is shown in FIG. 2 that a plurality of additional projections 8 are provided in the outlet zone 4 of the rotary tube 1, the additional projections 8 being arranged as groups 81 in the circumferential direction of the rotary tube 1 and offset from one another in the longitudinal direction of the rotary tube 1. These additional projections 8 (in technical terms, "swords") serve to prevent the formation of clusters in the burned material. As shown in FIG. 10, these additional projections 8 have the shape of a truncated pyramid with the base of an isosceles acute triangle, the acute angle leading in the direction of rotation D of the rotary tube 1 and being slightly truncated for stability reasons. For the sake of clarity, the outlet zone 4 with the additional projections 8 is shown again in detail in FIG. 9. The relative arrangement of the individual groups 81 of the additional projections 8 ("swords") to one another and to the groups 71 of the projections 7 ("drivers") in the inlet zone is shown in FIG. 5.

FIG. 5 now shows in highly schematic form a representation of the "unwound" inner kiln wall of the rotary tube 1. This means that the distribution of all projections 7 ("drivers") provided in the preheating zone 3a, further projections 6 ("displacers") in the inlet zone 2 as well as additional projections 8 ("swords") in the outlet zone 4 of the rotary tube 1 is shown in two-dimensional representation, whereby the burning zone 3b, in which no projections are provided in the present case, is not shown in full for reasons of space. Accordingly, six groups 61 each of five further projections 6 ("displacers") arranged in a row in a stepped form are provided in the inlet zone 2 distributed across the circumference. In the preheating zone 3 adjoining the inlet zone 2, there are also six groups 71 of projections 7 ("drivers") according to the invention arranged one behind the other in the longitudinal direction of the rotary tube 1. Projections 7 arranged adjacent to one another in the circumferential direction are positioned offset from one another, as shown by the auxiliary line V in FIG. 5. This offset arrangement results in spiral transport paths in the rotary tube 1, along which the material to be burned can move through the preheating zone 3a without obstruction. The spiral transport paths are shown by way of example in the two-dimensional representation of FIG. 5 as parallel lines S running diagonally.

Furthermore, FIG. 5 shows the additional projections 8 ("swords") provided in the outlet zone 4 of the rotary tube 1. As mentioned, these are arranged in groups 81 in the circumferential direction of the rotary tube 1, with the additional projections 8 of a group 81 being longitudinally offset from one another, in order to process a maximum amount of burned material. The offset in the longitudinal direction of the rotary tube 1 is shown in FIG. 5 by the auxiliary line V'. In the present case, two groups 81 of five additional projections 8 are provided. The group 81 arranged at the outlet end 4 of the rotary tube comprises only three additional projections 8. In contrast to the projections 6 of the inlet zone 2, the additional projections 8 do not extend to the outlet end 4a of the rotary tube 1. Rather, a certain distance of preferably approx. 1 m may be selected.

The invention claimed is:

1. A rotary kiln for burning carbonate-containing material, the rotary kiln comprising a rotary tube having an inlet end for feeding in the material to be burned and an outlet end for discharging the burned material, and a calciner unit which is arranged in the region of the outlet end, the rotary tube having an inlet zone at the inlet end and having an outlet zone at the outlet end, with a preheating zone and a burning zone being arranged between the inlet zone and the outlet zone in a transport direction of the material,
wherein a plurality of projections are arranged in the preheating zone of the rotary tube,
wherein the plurality of projections are arranged in groups with each group comprising a plurality of projections arranged one behind the other in a longitudinal direction of the rotary tube,
wherein each of the groups is substantially parallel to the longitudinal axis of the rotary tube,
wherein projections of adjacent groups in a circumferential direction of the rotary tube are offset relative to one another in the longitudinal direction of the rotary tube such that spiral transport paths for the material to be burned are formed in the preheating zone, and
wherein, in the circumferential direction, spaces are provided between the projections forming each spiral transport path.

2. The rotary kiln according to claim 1, wherein the plurality of projections each contain a refractory material.

3. The rotary kiln according to claim 1, wherein at least some of the plurality of projections have a prismatic geometry.

4. The rotary kiln according to claim 1,
wherein at least some of the plurality of projections have a height in the radial direction in relation to the rotary tube of between 50 mm and 500 mm,
and/or at least some of the plurality of projections have a length in the longitudinal direction of the rotary tube of between 50 mm and 2000 mm,
and/or in that at least some of the plurality of projections have a width perpendicular to the longitudinal direction of the rotary tube of between 50 mm and 1000 mm.

5. The rotary kiln according to claim 3, wherein at least some of the plurality of projections have the geometry of a trapezoidal prism, and the width of the lower trapezoidal base being between 100 mm and 400 mm.

6. The rotary kiln according to claim 1, wherein a ratio between the length of a projection in the longitudinal direction of the rotary tube and a distance between two projections adjacent in the longitudinal direction of the rotary tube is between approximately 2:1 and 1:2.

7. The rotary kiln according to claim 1, wherein at least some of the plurality of projections are fixed to an inner wall of the rotary tube by a metallic anchorage.

8. The rotary kiln according to claim 1, wherein distributed across the circumference of the rotary tube, 3 to 9 groups of projections arranged one behind the other in the longitudinal direction are provided.

9. The rotary kiln according to claim 1, wherein the groups of projections arranged one behind the other and substantially in parallel with the longitudinal axis of the rotary tube extend across one fifth to one third of a total length of the rotary tube.

10. The rotary kiln according to claim 1, wherein at least one further projection is provided in the inlet zone of the rotary tube, and the at least one further projection has at least one sliding surface inclined to the longitudinal axis of the rotary tube for conveying the material to be burned from the inlet zone into the preheating zone.

11. The rotary kiln according to claim 10, wherein a plurality of further projections is provided in the inlet zone of the rotary tube, the plurality of further projections being arranged in groups such that the respective sliding surfaces of the plurality of further projections in each group of further projections form a common sliding surface for the material to be burned.

12. The rotary kiln according to claim 11,
wherein the common sliding surface formed by the plurality of further projections of each group of further projections extends substantially across the entire length of the inlet zone.

13. The rotary kiln according to claim 10, wherein the at least one sliding surface of the at least one further projection has an inclination to the longitudinal axis of the rotary tube of 15° to 70°.

14. The rotary kiln according to claim 1, wherein a plurality of additional projections is provided in the region of the outlet zone, the plurality of additional projections being arranged as groups in the circumferential direction of the rotary tube, offset from one another in the longitudinal direction of the rotary tube, and wherein a plurality of groups of the plurality of additional projections is provided in the longitudinal direction of the rotary tube.

15. A method for burning carbonate-containing material characterized by the following steps:

introducing the carbonate-containing material into the rotary tube of a rotary kiln according to claim 1, burning the carbonate-containing material, the carbonate-containing material moving through the rotary tube from the inlet zone through the preheating zone and the burning zone to the outlet zone, the rotary tube rotating in a direction of rotation, and conveying the carbonate-containing material through the burning zone with a rotational speed and inclination of the rotary tube being adjusted such that the material is conveyed through the preheating zone on spiral transport paths.

16. The rotary kiln according to claim 2, wherein the refractory material comprises concrete or refractory concrete.

17. The rotary kiln according to claim 3, wherein the prismatic geometry comprises a trapezoidal prism or an isosceles trapezoidal prism.

18. A rotary kiln for burning carbonate-containing material, the rotary kiln comprising a rotary tube having an inlet end for feeding in the material to be burned and an outlet end for discharging the burned material, and a calciner unit which is arranged in the region of the outlet end, the rotary tube having an inlet zone at the inlet end and having an outlet zone at the outlet end, with a preheating zone and a burning zone being arranged between the inlet zone and the outlet zone in a transport direction of the material, wherein a plurality of projections are arranged in the preheating zone of the rotary tube, the plurality of projections are arranged in groups with each group comprising a plurality of projections arranged one behind the other in a longitudinal direction of the rotary tube, each of the groups in the preheating zone is substantially parallel to the longitudinal axis of the rotary tube, projections of adjacent groups in the preheating zone in a circumferential direction of the rotary tube are offset relative to one another in the longitudinal direction of the rotary tube such that spiral transport paths for the material to be burned are formed in the preheating zone, and in the circumferential direction, each group in the preheating zone is spaced apart from adjacent groups, and wherein a plurality of further projections is provided in the inlet zone of the rotary tube, each of the plurality of further projections has at least one sliding surface inclined to the longitudinal axis of the rotary tube for conveying the material to be burned from the inlet zone into the preheating zone, and the plurality of further projections are arranged in groups such that the respective sliding surfaces of the plurality of further projections in each group of further projections form a common sliding surface for the material to be burned.

19. The rotary kiln according to claim 18, wherein the common sliding surface formed by the plurality of further projections of each of group of further projections extends substantially across an entire length of the inlet zone.

20. The rotary kiln according to claim 18, wherein the at least one sliding surface of each of the further projections has an inclination to the longitudinal axis of the rotary tube of 15° to 70°.

* * * * *